United States Patent [19]

Canino

[11] 4,232,201
[45] Nov. 4, 1980

[54] DITHERED CENTER TRACKING SYSTEM

[75] Inventor: Lawrence S. Canino, Torrance, Calif.

[73] Assignee: MCA Discovision, Inc., Universal City, Calif.

[21] Appl. No.: 963,196

[22] Filed: Nov. 24, 1978

[51] Int. Cl.³ .............................................. G11B 21/02
[52] U.S. Cl. ............................................. 179/100.1 G
[58] Field of Search ................ 358/128; 179/100.3 V, 179/100.3 D, 100.1 G; 250/201, 202, 203 R; 360/77

[56] References Cited

U.S. PATENT DOCUMENTS

| | | | |
|---|---|---|---|
| 3,501,586 | 3/1970 | Russell | 179/100.3 V |
| 3,829,622 | 8/1974 | Elliot | 179/100.3 V |
| 3,985,952 | 10/1976 | Adler | 358/128 |
| 4,118,735 | 10/1978 | Wilkinson | 358/128 |

Primary Examiner—Robert S. Tupper
Assistant Examiner—Donald McElheny, Jr.
Attorney, Agent, or Firm—Ronald J. Clark

[57] ABSTRACT

A servo control system for maintaining an information detection device, such as a light beam, centered on a moving information track, such as a spiral recording track on a video disc. The system of the invention includes a dither signal generator, a bandpass filter for deriving an intermediate signal indicative of the effect of dither on the detected signal derived from the information track, and switching circuitry for deriving an error signal from the intermediate signal and the polarity of the dither signal. In one embodiment of the invention, the switching circuitry includes an inverter, and a switch for selecting either the intermediate signal or the inverted intermediate signal, in accordance with the polarity of the dither signal. The error signal thus derived is low-pass filtered and has a positive value when the center position of the beam moves to one side of the track, and a negative value when the center position of the beam moves to the other side. In an alternate embodiment, a pulse generator provides two trains of pulses occurring at the positive and negative peaks of the dither signal, respectively, and the pulse trains are employed to control two sample-to-hold circuits, respectively supplied with the intermediate signal and its inverse.

14 Claims, 10 Drawing Figures

DITHERED CENTER TRACKING SYSTEM

BACKGROUND OF THE INVENTION

This invention relates generally to systems for the reproduction of recorded information, such as video information recorded on a disc, and, more particularly, to systems for centering a light beam on an information track on such a disc.

Video and other types of information can be stored on a disc as a succession of light reflective and non-reflective regions along a spiral information track on the surface of a disc-shaped record carrier. In reproducing the video information, a video disc player employs an optical system for directing a radiant reading beam, such as a laser beam, onto the information track, and for detecting a reflected beam indicative of the reflectivity of the disc surface scanned by the laser beam as the disc is rotated. In a disc player of the type with which the invention may be employed, the intensity of the reflected beam takes the form of a high frequency carrier signal which is frequency modulated by the video information.

In order to store a reasonably large amount of information on the disc, successive turns of the information track must be so closely spaced that even a slight degree of disc eccentricity would cause the beam to traverse a number of adjacent tracks on each revolution. Consequently, some means must be provided for applying transverse or radial corrections to the beam position, so that it substantially follows along the center of the information track.

In a commonly assigned copending application, Ser. No. 766,928, now U.S. Pat. No. 4,118,735, entitled "Synchronous Detection Tracking", of which Richard L. Wilkinson is the inventor, a dither tracking system is disclosed, wherein a constant-frequency dither signal is applied to oscillate the reading beam, in a radial sense, as it moves along the information track. The dither signal is multiplied by a filtered form of the reflectivity signal, to derive an error signal having a positive value when the central beam position is to one side of the track, and a negative value when the beam moves to the other side of the track. The error signal is added to the oscillatory dither signal, before application to a beam positioning transducer, which thereby maintains the dither motion substantially about the center of the information track. Although this technique has proved satisfactory for many applications, it requires the use of analog multiplier circuits, which necessitate critical circuit adjustments and are subject to drift in characteristics over a period of time. Accordingly, there has been a need for an improved and more reliable technique of dither tracking which avoids the use of analog multipliers. The present invention is directed principally to this end.

SUMMARY OF THE INVENTION

The present invention resides in apparatus and a corresponding method for its use, for correcting the position of a detection means, such as a beam used to read information from a recording track, whereby the beam position is dithered perpendicularly to the track, and its center postion closely follows the center of the track. Basically, as it applies to a video disc player, the apparatus of the invention includes means for generating an oscillatory dither signal, means for bandpass filtering a reflectivity signal derived from the reflected light beam to obtain an intermediate signal by removing a carrier frequency component and a low frequency component due to transition from track to track, and means for deriving an error signal whose average value is proportional to the amplitude of the intermediate signal and whose polarity is determined by the phase of the dither signal with respect to the phase of the intermediate signal. When the intermediate signal and the dither signal are in phase, the error signal has one polarity, and when the dither signal and the intermediate signal are out of phase, i.e. have opposite polarities, the error signal has the opposite polarity.

In accordance with the best mode of the invention as presently contemplated, the means for generating the error signal comprises means for inverting the intermediate signal, and switch means operative to select the inverted or non-inverted forms of the intermediate signal. Operation of the switch means is controlled solely by the polarity of the dither signal, so that the intermediate signal is inverted on alternate half cycles of the dither signal. When the dither signal is in phase with the intermediate signal, the resulting error signal comprises a sequence of positive excursions, and when the dither signal is exactly out of phase with the intermediate signal, the resulting error signal comprises a sequence of negative excursions.

In an alternate embodiment of the invention, the means for generating the error signal includes a pulse generator, an inverter, and two sample-and-hold circuits. One sample-and-hold circuit is connected to sample information from the inverted intermediate signal and the other sample-and-hold circuit is connected to sample information from the non-inverted intermediate signal. Each sample-and-hold circuit is controlled by pulses from the pulse generator, generated in synchronism with the dither signal. Positive excursions of the dither signal activate one sample-and-hold circuit, while negative excursions of the dither signal activate the other sample-and-hold circuit. Consequently, the combined outputs of the sample-and-hold circuits, which are summed together, are positive when the dither signal is in phase with the intermediate signal, and are negative when the dither signal is out of phase with the intermediate signal.

In both of the aforedescribed embodiments, the resulting error signal is low-pass filtered to obtain a signal indicative of deviation of the center path of the beam from the center of the information track, and then combined additively with the dither signal, before amplification and application to control the beam position. It will be appreciated that, since the transducer elements involved in controlling the beam position and in detecting the reflected beam together involve a substantial phase shift, phase shift compensation must be supplied at some point in the system, to ensure that the phase of the dither signal and the phase of the intermediate signal are meaningfully compared.

It will be appreciated from the foregoing that the present invention represents a significant advance in the field of video reproduction systems, as well as in data retrieval systems in general. In particular, the invention provides a simplified and more reliable technique for ensuring that the beam used to read video information accurately follows the center of the information track on the disc. Other aspects and advantages of the present invention will become apparent from the following more detailed description, taken in conjunction with the accompanying drawings.

DESCRIPTION OF THE PREFERRED EMBODIMENTS

Figure 1:
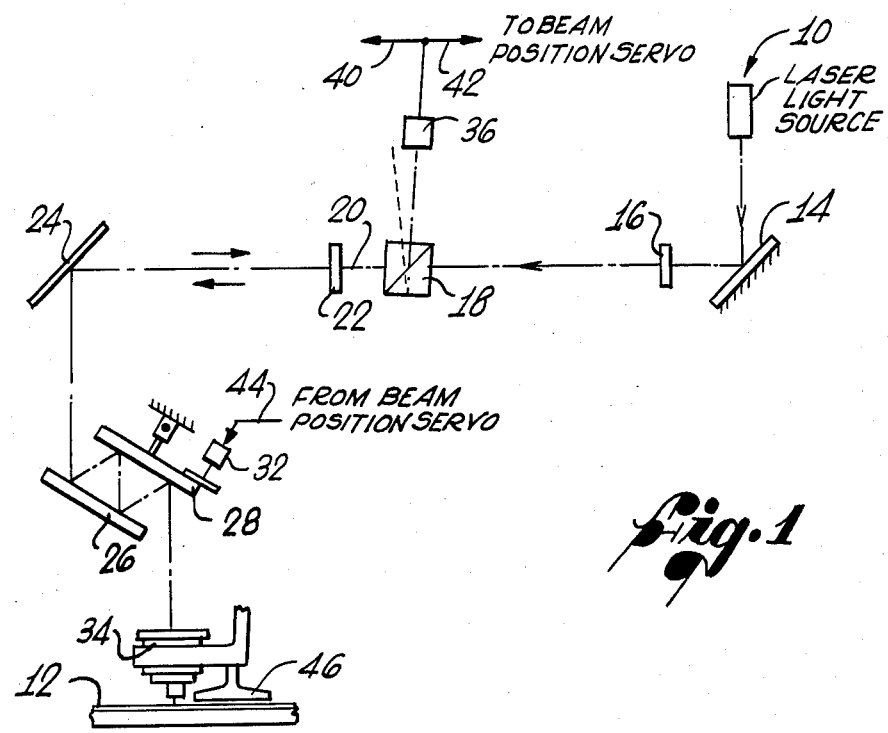
FIG. 1 is a simplified diagrammatical view of an optical playback system for video disc recordings.

As shown in the drawings for purposes of illustration, the present invention is concerned with a servo control system for maintaining a beam as nearly as possible in alignment with the center of a recording track on a video recording disc. In the optical system of video reproduction with which the present invention is principally concerned, video information is stored on a disc in the form of raised bumps or lands on the disc surface, and is read by means of a light beam scanned across the surface. The bumps exhibit a lower total light reflectivity than the flat areas between the bumps. Moreover, since the scanning beam has a width comparable to the bump width, the reflectivity signal obtained when the beam is scanned over a series of the bumps is substantially sinusoidal in nature. Information is encoded on the disc by forming a large number of bumps in a spiral track on the disc surface, such that the resultant reflectivity signal has the form of a sinusoidal carrier, which may be frequency modulated with the video information.

Since most discs, especially those produced for consumer use, will have relatively large eccentricities, some means must be provided for maintaining the reading beam centered on the information track as closely as possible. When only a single reading beam is utilized both for obtaining information recorded on the track and for obtaining an error signal for centering the beam, a radial oscillatory motion, usually referred to as a dither, must be applied to the beam in order to determine in which direction a correction signal should be applied to keep the beam centered on the track. As set forth in the aforementioned copending patent application, an error signal can be obtained by a process of analog multiplication of the dither signal with an intermediate signal derived by filtering the reflectivity signal.

As shown in FIG. 1, in a typical optical playback assembly a laser light source, indicated by reference numeral 10, directs light onto a disc surface 12. The reading beam from the laser is first reflected by a plane mirror 14, and then focused by a lens 16 onto a beam splitting prism 18, the transmitted portion of the beam, indicated at 20, then being directed through a quarter-wave plate 22, and thence reflected from two successive fixed mirrors 24 and 26, and then from a movable mirror 28, which is pivotally mounted as shown at 30, and is adjustable in angle by means of a transducer 32. Finally the beam is passed through an objective lens system 34 and focused on the disc 12. A beam reflected from the disc follows essentially the same path back to the beam splitting prism 18, at which point the reflected beam is further reflected by the prism to a light detector 36.

The detector 36 is a photoelectric transducer from which an output signal is transmitted to video signal processing circuitry, as indicated at 40, and to a beam position servo mechanism, over line 42. Typically, the read beam is made to follow the spiral track by translating the entire optical playback assembly radially across the disc at a constant speed, with corrections for eccentricity and other tracking errors being made by means of the mirror positioning transducer 32, in accordance with a control signal supplied over line 44. The optical playback assembly may be supported at a constant distance above the disc by an air bearing, as indicated at 46.

Figure 4A:
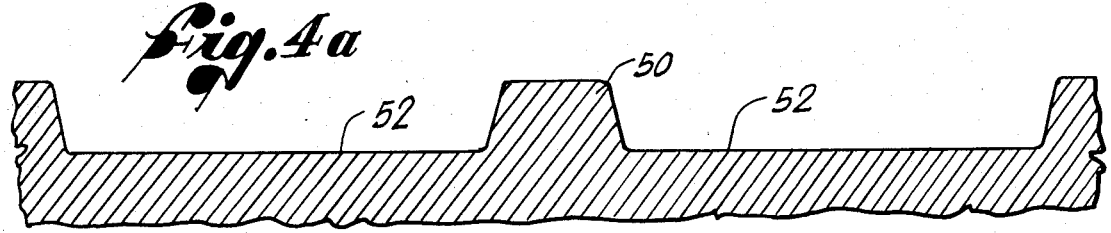
FIG. 4a is a fragmentary cross-sectional view of the surface of a recording disc taken along a radial line through the center of the disc.
Figure 4B:
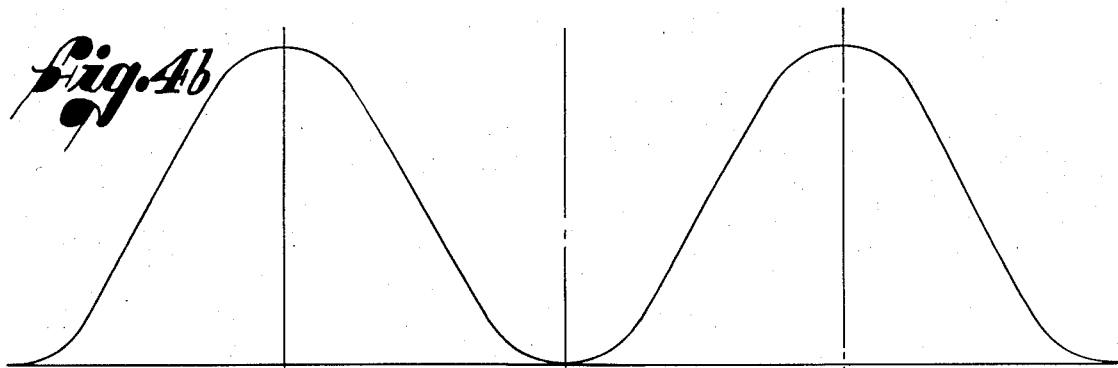
FIG. 4b is a graph showing the variation of disc reflectivity along a portion of a disc radius.

As shown in FIGS. 4a and 4b, the reflectivity signal of FIG. 4b varies between a maximum value between tracks and a minimum value over the center of a track. The approximately sinusoidal shape of this characteristic is derived from the fact that the bump at the center of the track, indicated at 50, is less reflective than the wider flat area 52 between tracks, and the width of the reading beam is comparable in size to the width of the bump. It should be noted that the reflectivity signal of FIG. 4b would be obtained only if the beam were allowed to traverse between tracks in an open-loop or uncontrolled fashion. Moreover, for simplicity the reflectivity signal has been shown as a pure sine wave, but it will be appreciated that an actual reflectivity signal would contain a very high frequency carrier signal component due to the bumps traversed along each track. As will be later explained, this high frequency component is, in any event, filtered out and need not be further considered for purposes of explaining the invention.

Figure 4C:
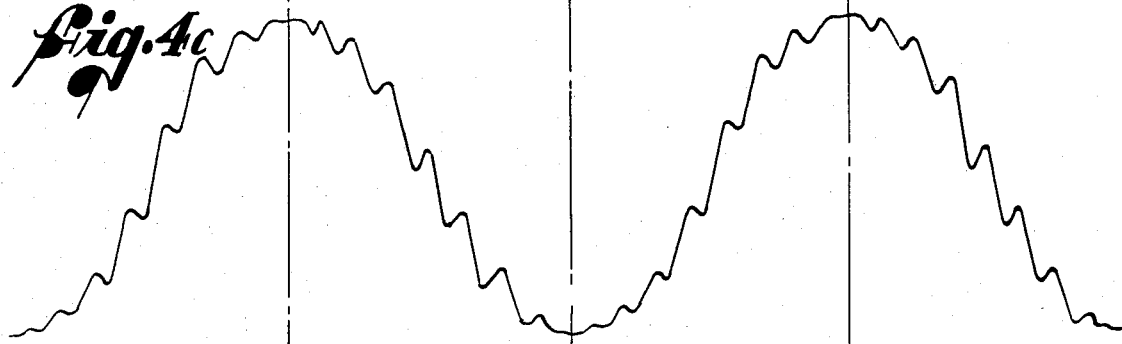
FIG. 4c is a graph of the reflectivity signal corresponding to FIG. 4b combined with the effect of a radial dither signal.
Figure 4D:
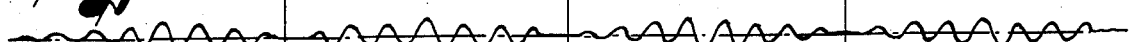
FIG. 4d is a graph of the intermediate signal obtained by bandpass filtering the signal of FIG. 4c to eliminate very high frequency and very low frequency components.
Figure 4E:
FIG. 4e is a graph of a constant-frequency, constant-amplitude dither signal, after appropriate phase correction for correlation with the intermediate signal of FIG. 4d.

In the type of control system with which the present invention is concerned, a dither signal, indicated diagrammatically in FIG. 4e, is applied to the transducer 32 (FIG. 1) controlling the radial position of the beam. It will be apparent that the effect of the dither signal on the reflectivity signal of FIG. 4b is as shown in FIG. 4c, in which it will be noted that the dither has its greatest effect on the steepest slope portion of the reflectivity curve. At the relatively flat top and bottom of the reflectivity curve, small radial oscillations have little or no effect on the reflectivity. It will also be apparent that, when the beam is on the left-hand side of a bump 50, as viewed in FIG. 4a, a dither motion to the left further increases the reflectivity, but when the beam is on the right-hand side of the bump, a dither motion to the left decreases reflectivity. It is, of course, this directional difference that permits the dither correction system to discriminate between position errors on one side of the track as opposed to those on the other.

If the dither reflectivity signal is bandpass filtered to eliminate the low frequency component due to transitions from track to track, and the high frequency component due to the carrier frequency, the result is the intermediate signal shown in FIG. 4d.

Basically, the intermediate signal of FIG. 4d contains only information indicative of the effect of dither on the reflectivity signal. It will be noted that the phase of this intermediate signal changes at points corresponding to the centers of the tracks and the centers of the spacings between tracks. In a dither tracking system, the phase of the intermediate signal of FIG. 4d is compared with the phase of the dither signal of FIG. 4e.

In accordance with the present invention, an error signal is derived from the intermediate signal and the polarity of the dither signal, and is applied to the beam positioning transducer in combination with the dither signal. The manner in which the dither signal and the intermediate signal are combined will now be explained in detail with reference to FIGS. 2 and 3.

Figure 2:
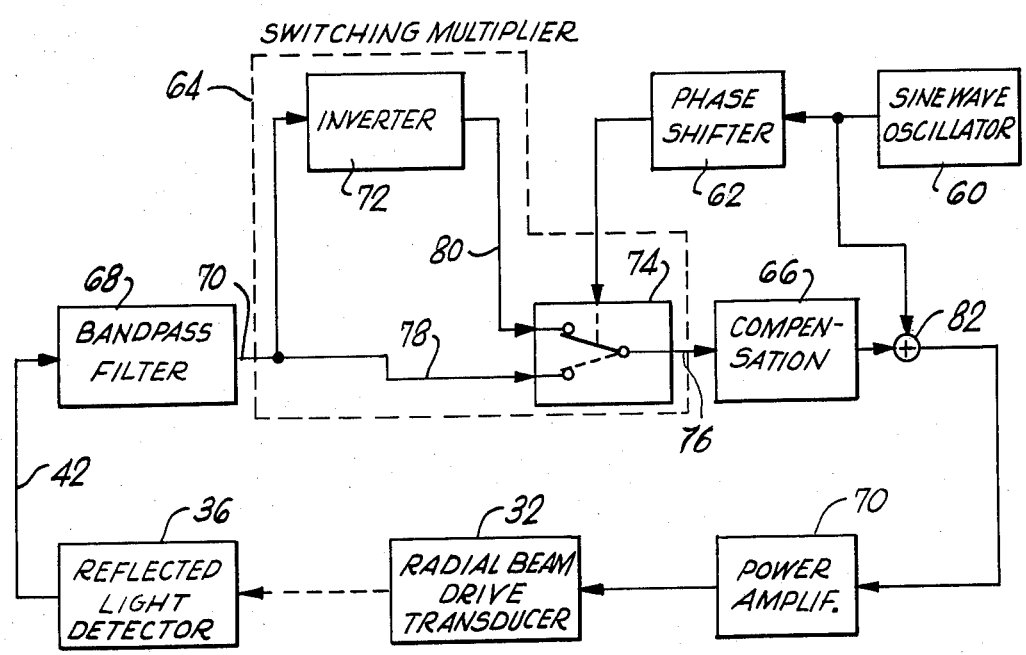
FIG. 2 is a block diagram of a beam position servo control system utilizing the principles of the present invention.

As shown in FIG. 2, the beam positioning servo circuit comprises a sine wave oscillator 60 for generating the dither signal, a phase shifter 62, a switching multiplier 64, a compensation network 66, a bandpass filter 68, and a power amplifier 70. An output signal from the circuit is obtained from the power amplifier and supplied over line 44 to the beam positioning transducer 32. The light reflectivity signal is derived from the reflected light detector 36, over line 42 to the bandpass filters. The bandpass filter 68 performs the filtering functions necessary to obtain the intermediate signal of FIG. 4d, which is then transmitted over line 70 to the switching multiplier 64.

The switching multiplier 64 comprises an inverter 72 and a switch 74. The filtered signal from the bandpass filter 68 is connected both to the inverter 72 and to one pole of the switch 74, and the signal from the inverter 72 is connected to the other pole of the switch. In operation, the switch 74 selects one or the other the input signals, i.e., either the inverted or the non-inverted signal from the bandpass filter 68. A dither signal from the sine wave oscillator 60 is passed through the phase shifter 62, which is merely to compensate for phase shifts introduced in elements of the circuit between oscillator 60 and the switch 74, including the power amplifier 70, transducer 32, detector 36, and filter 68. As will be further explained, the dither signal is then used to control the position of the switch 74 in such a manner that the output of the switching multiplier on line 76 to the compensation circuit 66 comprises either the inverted or the non-inverted signal from the bandpass filter 68. Basically, the switch 74 is responsive to the instantaneous polarity of the phase-corrected dither signal, i.e., when the phase-corrected dither signal is positive, the non-inverted intermediate signal on line 78 from the filter 68 is selected, and when the phase-corrected dither signal is negative, the inverted signal on line 80 from the inverter is selected.

Figure 4F:
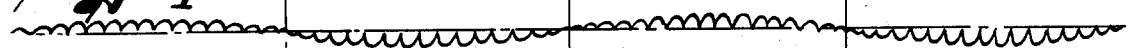
FIG. 4f is a graph of the error signal derived from the intermediate signal of FIG. 4d and the phase-corrected dither signal of FIG. 4e, and utilizing the circuitry of the invention shown in FIG. 2.

It will be apparent that the resulting error signal output from the switching multiplier on line 76 is of the type illustrated in FIG. 4f. When the beam is on the right hand side of a bump 50 or track, the intermediate signal is always in phase with the dither signal and the resulting error signal consists of only positive excursions. On the other hand, when the beam is on the left-hand side of a track, the intermediate signal of FIG. 4d is out of phase with the dither signal, and only negative excursions of the error signal result, as shown in FIG. 4f.

The resulting error signal of FIG. 4f is next low-pass filtered in the compensation network 66 to produce essentially a sine-wave-shaped error signal, ninety degrees out of phase with the reflectivity signal of FIG. 4b. This error signal is combined with the dither signal in a summing circuit 82 and applied to the power amplifier 70, and thence to the beam positioning transducer 32.

Figure 3:
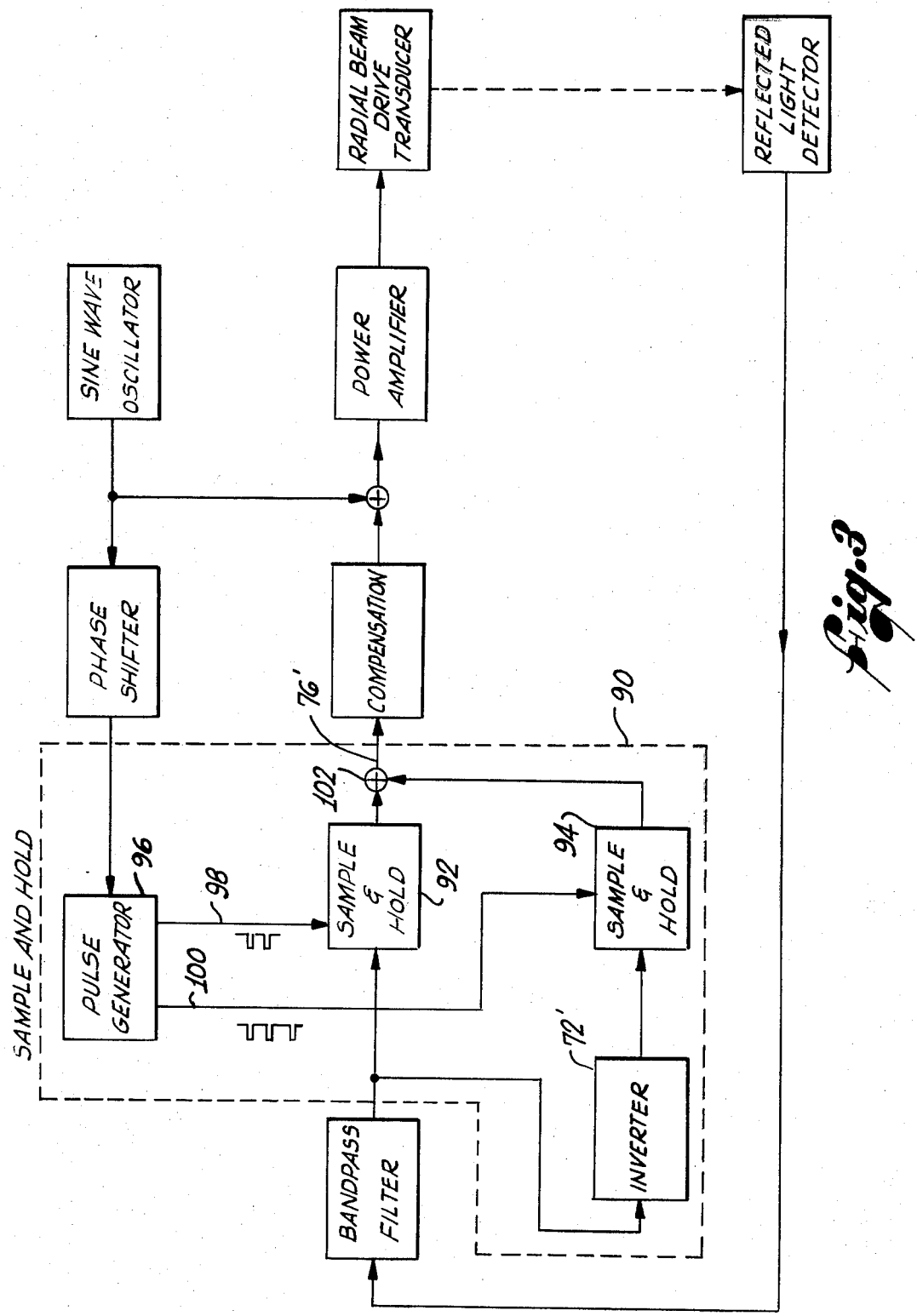
FIG. 3 is a block diagram showing an alternate form of a beam position servo control system utilizing the present invention.
Figure 4G:
FIG. 4g is a graph of the error signal derived from the intermediate signal of FIG. 4d and the phase-corrected dither signal of FIG. 4e, and utilizing the circuitry of the invention shown in FIG. 3.

In accordance with the embodiment of the invention shown in FIG. 3, the switching multiplier of FIG. 2 is replaced by a sample-and-hold network 90. In this case, the output of the bandpass filter 68 is applied to a first sample-and-hold circuit 92 and through an inverter 72' to a second sample-and-hold circuit 94. The output of the phase shifter 62 is used to control a pulse generator 96 which generates one set of pulses corresponding to the positive peaks of the phase-corrected dither signal, supplied over line 98 to the first sample-and-hold circuit 92, and another set of pulses corresponding to the negative peaks of the phase-corrected dither signal, supplied over line 100 to the second sample-and-hold circuit 94. Again, it will be apparent that, when the beam is on the right-hand side of a track, the phase-corrected dither signal will be in phase with the intermediate signal of FIG. 4d, and only positive outputs from the sample and hold circuits will result. If the beam is positioned on the left-hand side of a track, negative outputs from the sample-and-hold circuits will result. As also shown in FIG. 3, the outputs of the sample-and-hold circuits on lines 92 and 94 are combined in a summing circuit 102 and output over line 76' to the compensation network 66. The error signal output on line 76' from the sample-and-hold network 90 is basically as shown in FIG. 4g, and this waveform is low-pass filtered in the compensation circuit 66 before application to the beam positioning transducer 32.

It will be appreciated from the foregoing that the present invention represents a significant advance in the field of dither tracking systems, especially as applied in video disc reproduction systems. In particular, the invention provides a simple and reliable technique for deriving a tracking error signal for application to a beam positioning transducer. It will also be appreciated that, although specific embodiments of the invention have been described in detail for purposes of illustration, various modifications may be made without departing from the spirit and scope of the invention. Accordingly, the invention is not to be limited, except as by the appended claims.

I claim:

1. For use in an information storage and retrieval system having a detection means for deriving an information signal from an information track, apparatus for controlling the position of the detection means to follow the information track, said apparatus comprising:

first transducer means for moving the detection means transversely with respect to the information track;

second transducer means for deriving an information signal from the detection means;

means for generating an oscillatory dither signal for application to said first transducer means;

means for bandpass filtering said information signal to obtain an intermediate signal indicative of the effect of dither on said information signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude proportional to that of said intermediate signal and a polarity derived from the product of the intermediate signal polarity and the phase-corrected dither signal polarity; and means for combining said error signal and said dither signal for application to said first transducer means.

2. For use in a video disc record player having a reading beam for deriving a modulated light signal from an information track on a video disc record, a system for controlling beam position to follow the information track, said system comprising:

first transducer means for moving the beam radially;

second transducer means for deriving a modulated light signal from energy reflected from the disc;

means for generating an oscillatory dither signal for application to said first transducer means;

means for bandpass filtering said modulated light signal to obtain an intermediate signal indicative of the effect of dither on said modulated light signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude proportional to that of said intermediate signal and a polarity derived from the product of the intermediate signal polarity and the phase-corrected dither signal polarity; and means for combining said error signal and said dither signal for application to said first transducer means.

3. For use in a video disc record player having a reading beam for deriving a modulated light signal from an information track on the disc, a method for centering the beam as closely as possible to the center of the track, said method comprising the steps of:

generating an oscillatory dither signal for application to a transducer to dither the beam radially;

bandpass filtering the modulated light signal to obtain an intermediate signal indicative of the effect of the dither signal on the modulated light signal;

shifting the phase of the dither signal to obtain a phase-corrected dither signal for correlation with the intermediate signal;

deriving an error signal having, at any instant, a magnitude proportional to that of the intermediate signal and a polarity derived from the product of the polarity of the intermediate signal and the polarity of the dither signal;

low-pass filtering the error signal; and combining the filtered error signal with the dither signal for application to the transducer to control radial beam position.

4. For use in a storage and retrieval system having a detection means for deriving an information signal from an information track, a method for centering the detection means as closely as possible to the center of the track, said method comprising the steps of:

generating an oscillatory dither signal for application to a transducer to dither the detection means transversely with respect to the track;

bandpass filtering the information signal to obtain an intermediate signal indicative of the effect of the dither signal on the information signal;

shifting the phase of the dither signal to obtain a phase-corrected dither signal for correlation with the intermediate signal;

deriving an error signal having, at any instant, a magnitude proportional to that of the intermediate signal and a polarity derived from the product of the polarity of the intermediate signal and the polarity of the dither signal; and low-pass filtering the error signal and combining it with the dither signal for application to the transducer to control the transverse position of the detection means.

5. For use in an information storage and retrieval system having a detection means for deriving an information signal from an information track, apparatus for controlling the position of the detection means to follow the information track, said apparatus comprising:

first transducer means for moving the detection means transversely with respect to the information track;

second transducer means for deriving an information signal from the detection means;

means for generating an oscillatory dither signal for application to said first transducer means;

means for bandpass filtering said information signal to obtain an intermediate signal indicative of the effect of dither on said information signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude derived from said intermediate signal and a polarity derived from the product of the intermediate signal polarity and the phase-corrected dither signal polarity, and wherein said means for deriving an error signal includes means for inverting said intermediate signal, and switch means responsive to the polarity of said phase-corrected dither signal for selecting between said intermediate signal and its inverse; and means for combining said error signal and said dither signal for application to said first transducer means.

6. For use in an information storage and retrieval system having a detection means for deriving an information signal from an information track, apparatus for controlling the position of the detection means to follow the information track, said apparatus comprising:

first transducer means for moving the detection means transversely with respect to the information track;

second transducer means for deriving an information signal from the detection means;

means for generating an oscillatory dither signal for application to said first transducer means;

means for bandpass filtering said information signal to obtain an intermediate signal indicative of the effect of dither on said infomation signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude derived from said intermediate signal and a polarity derived from the product of the intermediate signal polarity and the phase-corrected dither signal polarity, and wherein said means for deriving an error signal includes means for inverting said intermediate signal, first and second sample-and-hold means connected to sample said intermediate signal and its inverse, respectively, and pulse generation means responsive to said phase-corrected dither signal to generate a first train of pulses corresponding to positive peaks of said phase-corrected dither signal and a second train of pulses corresponding to negative peaks of said phase-corrected dither signal, said first and second trains of pulses being coupled to said first and second sample-and-hold means, respectively, whereby said sample-and-hold means supply said error signal; and means for combining said error signal and said dither signal for application to said first transducer means.

7. For use in a video disc record player having a reading beam for deriving a modulated light signal from an information track on a video disc record, a system for controlling beam position to follow the information track, said system comprising:

first transducer means for moving the beam radially;

second transducer means for deriving a modulated light signal from energy reflected from the disc;

means for generating an oscillatory dither signal for application to said first transducer means;

means for bandpass filtering said modulated light signal to obtain an intermediate signal indicative of the effect of dither on said modulated light signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude derived from said intermediate signal and a polarity derived from the product of the intermediate signal polarity and the phase-corrected dither signal polarity, and wherein said means for deriving an error signal includes means for inverting said intermediate signal, and switch means responsive to the polarity of said phase-corrected dither signal for selecting between said intermediate signal and its inverse; and means for combining said error signal and said dither signal for application to said first transducer means.

8. A system as set forth in claim 7, wherein said means for deriving an error signal further includes low-pass filter means for removing from said error signal components corresponding to the dither signal frequency and higher frequencies.

9. A system as set forth in claim 8, and further including phase compensation means, to compensate for phase shifts in said first and second transducer means.

10. For use in a video disc record player having a reading beam for deriving a modulated light signal from an information track on a video disc record, a system for controlling beam position to follow the information track, said system comprising:

first transducer means for moving the beam radially;

second transducer means for deriving a modulated light signal from energy reflected from the disc;

means for generating an oscillatory dither signal for application to said first transducer means;

means for bandpass filtering said modulated light signal to obtain an intermediate signal indicative of the effect of dither on said modulated light signal;

means for correcting the phase of said dither signal to obtain a phase-corrected dither signal for correlation with said intermediate signal;

means for deriving an error signal from said intermediate signal and the polarity of said phase-corrected dither signal, wherein said error signal at any instant has a magnitude derived from said intermediate signal and a polarity derived from the product of the intermediate signal polarity and the phase-corrected dither signal polarity, and wherein said means for deriving an error signal includes means for inverting said intermediate signal, first and second sample-and-hold means connected to sample said intermediate signal and its inverse, respectively, and pulse generation means responsive to said phase-corrected dither signal to generate a first train of pulses corresponding to positive peaks of said phase-corrected dither signal and a second train of pulses corresponding to negative peaks of said phase-corrected dither signal, said first and second trains of pulses being coupled to said first and second sample-and-hold means, respectively, whereby said sample-and-hold means supply said error signal; and means for combining said error signal and said dither signal for application to said first transducer means.

11. A system as set forth in claim 10, wherein said means for deriving an error signal further includes low-pass filter means for removing from said error signal components corresponding to the dither signal frequency and higher frequencies.

12. A system as set forth in claim 11, and further including phase compensation means, to compensate for phase shifts in said first and second transducer means.

13. For use in a video disc record player having a reading beam for deriving a modulated light signal from an information track on the disc, a method for centering the beam as closely as possible to the center of the track, said method comprising the steps of:

generating an oscillatory dither signal for application to a transducer to dither the beam radially;

bandpass filtering the modlated light signal to obtain an intermediate signal indicative of the effect of the dither signal on the modulated light signal;

shifting the phase of the dither signal to obtain a phase-corrected dither signal for correlation with the intermediate signal;

deriving an error signal from the intermediate signal and the phase-corrected dither signal polarity, wherein said deriving step includes inverting the intermediate signal, and selecting the intermediate signal or the inverted intermediate signal, as determined by the polarity of the phase-corrected dither signal;

low-pass filtering the error signal; and combining the filtered error signal with the dither signal for application to the transducer to control radial beam position.

14. For use in a video disc record player having a reading beam for deriving a modulated light signal from an information track on the disc, a method for centering the beam as closely as possible to the center of the track, said method comprising the steps of:

generating an oscillatory dither signal for application to a transducer to dither the beam radially;

bandpass filtering the modulated light signal to obtain an intermediate signal indicative of the effect of the dither signal on the modulated light signal;

shifting the phase of the dither signal to obtain a phase-corrected dither signal for correlation with the intermediate signal;

deriving an error signal from the intermediate signal and the phase-corrected dither signal polarity, wherein said deriving step includes inverting the intermediate signal, and sampling and holding the intermediate signal or the inverted intermediate signal, as determined by the polarity of the phase-corrected dither signal;

low-pass filtering the error signal; and combining the filtered error signal with the dither signal for application to the transducer to control radial beam position.

* * * * *